US011055834B2

(12) United States Patent
Shibata

(10) Patent No.: US 11,055,834 B2
(45) Date of Patent: Jul. 6, 2021

(54) INFORMATION PROCESSING DEVICE, INFORMATION PROCESSING METHOD, AND RECORDING MEDIUM FOR PROCESSING SYNTHESIZED IMAGES

(71) Applicant: NEC CORPORATION, Tokyo (JP)

(72) Inventor: Takashi Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/637,560

(22) PCT Filed: Aug. 22, 2018

(86) PCT No.: PCT/JP2018/030930
§ 371 (c)(1),
(2) Date: Feb. 7, 2020

(87) PCT Pub. No.: WO2019/044608
PCT Pub. Date: Mar. 7, 2019

(65) Prior Publication Data
US 2020/0219241 A1 Jul. 9, 2020

(30) Foreign Application Priority Data
Aug. 29, 2017 (JP) .............................. JP2017-164225

(51) Int. Cl.
*G06T 5/50* (2006.01)
(52) U.S. Cl.
CPC ...... *G06T 5/50* (2013.01); *G06T 2207/20221* (2013.01)
(58) Field of Classification Search
CPC .................... G06T 5/50; G06T 2206/20221
See application file for complete search history.

(56) References Cited

U.S. PATENT DOCUMENTS

2009/0315869 A1* 12/2009 Sugihara ............... G06F 1/1605
345/204
2013/0215293 A1* 8/2013 Kim .................... H04N 5/23219
348/239

(Continued)

FOREIGN PATENT DOCUMENTS

JP 2007-266713 A 10/2007
JP 2007-274213 A 10/2007

(Continued)

OTHER PUBLICATIONS

Takeshi Shibata et al., "Visible and Near-Infrared Image Fusion based on Visually Salient Area Selection", SPIE Proceeding, Digital Photography XI, (Feb. 27, 2015), pp. 94040G-1-94040G-6, vol. 9404.

(Continued)

*Primary Examiner* — Terrell M Robinson
(74) *Attorney, Agent, or Firm* — Sughrue Mion, PLLC

(57) ABSTRACT

An information processing device according to the present invention includes: a memory; and a processor. The processor performs operations. The operations includes: calculating an index for selecting a predetermined region in a pixel of an image; calculating a position difference amount between a first image at a first time among moving images having different properties, and a first synthetic image at a second time being a time previous to the first time; generating a second synthetic image by deforming the first synthetic image, based on the position difference amount; generating first information indicating a first region where a first index in the first image satisfies a predetermined condition, and a second region where a second index in the second synthetic image satisfies a predetermined condition; and synthesizing a third synthetic image at the first time, (Continued)

based on the first image, the second synthetic image, and the first information.

6 Claims, 7 Drawing Sheets

(56) References Cited

U.S. PATENT DOCUMENTS

2014/0270487 A1* 9/2014 Park ................. H04N 5/2355
                                                            382/155
2016/0212411 A1* 7/2016 Lindner ................. G06T 5/50

FOREIGN PATENT DOCUMENTS

| JP | 2010-118917 A | 5/2010 |
| JP | 2011-242134 A | 12/2011 |
| JP | 2015-104016 A | 6/2015 |
| JP | 2016-032289 A | 3/2016 |
| JP | 2016032289 A * | 3/2016 |

OTHER PUBLICATIONS

Written Opinion for PCT/JP2018/030930, dated Oct. 23, 2018.
International Search Report for PCT/JP2018/030930, dated Oct. 23, 2018.

* cited by examiner

INFORMATION PROCESSING DEVICE, INFORMATION PROCESSING METHOD, AND RECORDING MEDIUM FOR PROCESSING SYNTHESIZED IMAGES

CROSS REFERENCE TO RELATED APPLICATIONS

This application is a National Stage of International Application No. PCT/JP2018/030930 filed Aug. 22, 2018, claiming priority based on Japanese Patent Application No. 2017-164225 filed Aug. 29, 2017, the disclosure of which is incorporated herein in its entirety by reference.

TECHNICAL FIELD

The present invention relates to processing of an image, and particularly relates to information processing using a plurality of images.

BACKGROUND ART

Processing using an image is widely used because of a lowering price of an imaging device, and an enhanced function of image processing.

Furthermore, imaging devices (e.g., a camera or an image sensor) adaptive to various purposes are developed as an imaging device.

As an imaging device, there is an imaging device which can change an image capturing condition. For example, a camera can generally change an exposure amount and an exposure time (shutter speed). Further, a camera can acquire substantially different images depending on whether or not a flash is used during image capturing.

Alternatively, there is a camera equipped with a sensitivity characteristic to a different wavelength region, such as a visible-light camera and an infrared camera. For example, in order to monitor a person or the like during daytime or in an illuminated place, a monitoring camera using a visible-light sensor is widely diffused. On the other hand, for monitoring at night, a camera using an invisible-light sensor, such as a near-infrared camera or a far-infrared camera, is widely diffused. Alternatively, a near-ultraviolet camera may be used. Alternatively, a device which images a wavelength longer than a wavelength region of infrared light, such as a terahertz wave or a radio wave, may be used.

Furthermore, processing using a plurality of images (e.g., synthesis of images) can provide further utility in addition to utility in processing using a single image. For example, synthesis of images can achieve noise removal and the like. Accordingly, various image synthesis techniques are developed (e.g., PTLs 1 and 2, and NPL 1).

An image processing device described in PTL 1 accelerates detection processing of a position difference between images during synthesis of a plurality of images.

An image composition system described in PTL 2 improves visibility by use of a plurality of images having different properties.

NPL 1 discloses a method of synthesizing one image including a region having high visibility in each image, from an image group including images in a plurality of wavelength regions (bands) or properties (modes) acquired from a plurality of sensors.

CITATION LIST

Patent Literature

[PTL 1] Japanese Unexamined Patent Application Publication No. 2007-274213
[PTL 2] Japanese Unexamined Patent Application Publication No. 2016-032289

Non Patent Literature

[NPL 1] Takeshi Shibata, Masayuki Tanaka, and Masatoshi Okutomi, "Visible and near-infrared image fusion based on visually salient area selection", SPIE Proceeding, Volume 9404, Digital Photography XI, 94040G (Feb. 27, 2015)

SUMMARY OF INVENTION

Technical Problem

A moving image includes a plurality of sequentially captured images at different times (hereinafter, an image capturing time is also referred to as a "frame"). In a moving image, a predetermined region (e.g., a region having high visibility) becomes important. In the following description, a predetermined region which becomes important is also referred to as an "important region".

One image capturing target may be monitored by use of moving images having a plurality of properties. For example, monitoring of a target region is performed by use of a visible-light moving image and an infrared-light moving image.

However, it is difficult for a monitoring person to simultaneously monitor a plurality of moving images. Thus, using a moving image of a synthetic image synthesizing a plurality of moving images is desired. When a plurality of moving images are used, an image in which important regions in a plurality of moving images are extracted and then synthesized is used in each frame (e.g., see NPL 1).

However, when a plurality of moving images are used, an important region may appear at a different time (frame) in each moving image. Hereinafter, a case where an important region appears at a different time (frame) in each of a plurality of moving images is referred to as "important regions are scattered in frames". When an image is synthesized by use of a moving image, synthesis using important regions scattered in frames is needed.

In a plurality of still images in the same frame, important regions are at about the same position. However, a moving body such as a person changes in position over time. When important regions are scattered in frames, image synthesis using an important region needs to adapt to a positional change of an important region in different frames.

The invention described in each of PTL 2 and NPL 1 is an invention which synthesizes one image having high visibility from a plurality of still images. Thus, the invention described in each of PTL 2 and NPL 1 is not able to synthesize an image by use of important regions scattered in frames.

The invention described in PTL 1 is an invention which accelerates detection processing of a position difference, and does not solve the problem described above.

In this way, the invention described in each of PTLs 1 and 2, and NPL 1 has an issue of being unable to synthesize an image by use of predetermined regions (important regions in the example described above) scattered in frames in a moving image.

An object of the present invention is to provide an information processing device and the like which solve the problem described above, and synthesize an image by use of predetermined regions scattered in frames in a moving image.

Solution to Problem

An information processing device according to one aspect of the present invention includes: a memory; and
at least one processor coupled to the memory
The process performs operations. The operations includes:
calculating an index for selecting a predetermined region in a pixel of an image;
calculating a position difference amount between a first image at a first time among a plurality of moving images having different properties, and a first synthetic image at a second time being a time previous to the first time;
generating a second synthetic image by deforming the first synthetic image, based on the position difference amount;
generating first information indicating a first region where a first index in the first image satisfies a predetermined condition, and a second region where a second index in the second synthetic image satisfies a predetermined condition; and
synthesizing a third synthetic image at the first time, based on the first image, the second synthetic image, and the first information.

An information processing system according one aspect of the present invention includes:
the above-mentioned information processing device; and
a display device that displays the third synthetic image by receiving the third synthetic image from the information processing device.

An information processing method according to one aspect of the present invention includes:
calculating an index for selecting a predetermined region in a pixel of an image;
calculating a position difference amount between a first image at a first time among a plurality of moving images having different properties, and a first synthetic image at a second time being a time previous to the first time;
generating a second synthetic image by deforming the first synthetic image, based on the position difference amount;
generating first information indicating a first region where a first index in the first image satisfies a predetermined condition, and a second region where a second index in the second synthetic image satisfies a predetermined condition; and
synthesizing a third synthetic image at the first time, based on the first image, the second synthetic image, and the first information.

A non-transitory computer-readable recording medium according to one aspect of the present invention embodies a program. The program causes a computer to perform a method. The method includes:
calculating an index for selecting a predetermined region in a pixel of an image;
calculating a position difference amount between a first image at a first time among a plurality of moving images having different properties, and a first synthetic image at a second time being a time previous to the first time;
generating a second synthetic image by deforming the first synthetic image, based on the position difference amount;
generating first information indicating a first region where a first index in the first image satisfies a predetermined condition, and a second region where a second index in the second synthetic image satisfies a predetermined condition; and
synthesizing a third synthetic image at the first time, based on the first image, the second synthetic image, and the first information.

Advantageous Effects of Invention

According to the present invention, it is possible to provide an advantageous effect of synthesizing an image by use of predetermined regions scattered in frames in a moving image.

EXAMPLE EMBODIMENT

Figure 1:
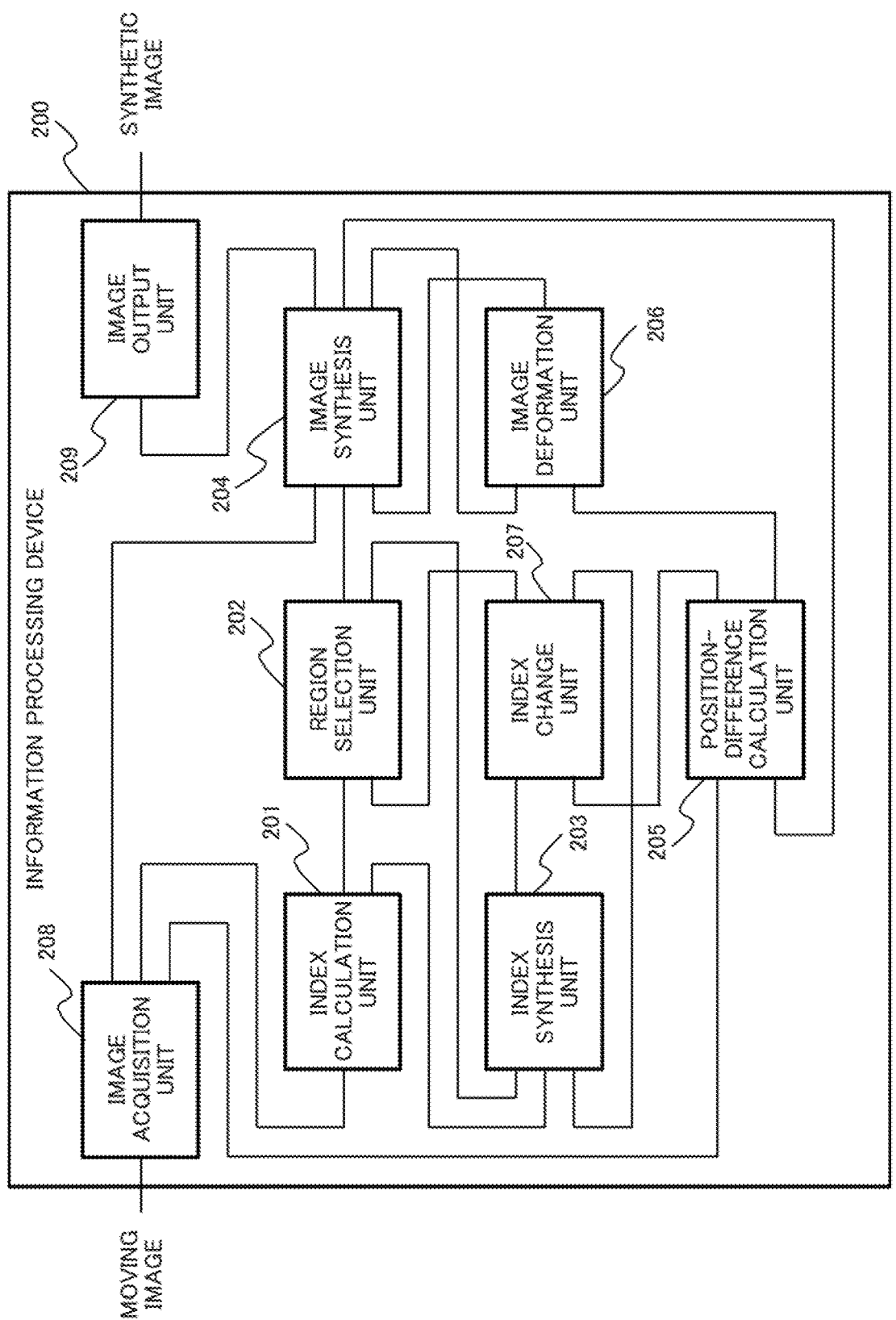
FIG. 1 is a block diagram illustrating one example of a configuration of an information processing device according to a first example embodiment of the present invention.

Next, an example embodiment of the present invention will be described with reference to the drawings.

Each drawing serves to describe the example embodiment of the present invention. However, the present invention is not limited to the description in each drawing. Moreover, the same number may be given to a similar component in each drawing, and repeated description thereof may be omitted. Further, description may be omitted with regard to a component of a part which is not related to the description of the present invention in the drawing used for the following description, and the component may not be illustrated in the drawing.

In the example embodiment of the present invention, a plurality of moving images having different properties which are simultaneously captured for the same image capturing target are used as targets for processing. In the following description, "m" is an identifier for differentiating a moving image. It is assumed that "m" is an integer of 1 or more.

A "moving image" is an image group sequentially including a "still image" captured with a predetermined period. In the following description, each image capturing time is also referred to as a "frame". Note that an image capturing period may change.

Each of a plurality of moving images includes a still image of the same time (the same frame).

However, in the present example embodiment, the "same time" is not limited to a case of a completely same time. In the following description, a still image of the same time may be a still image included in a predetermined time width to be a range processable as a still image of the same time.

A reason for this is that the following factor is considered.

In an actual imaging device, a necessary exposure time differs in relation to performance of an image capturing element and/or a property described below. Thus, even when still images are captured at the same time, the imaging device captures each of the still images at a different time, strictly speaking. However, the still images are still images processable as still images of the same time in an actual operation.

A "current frame" is a time of a still image to be a processing target. In the following description, a current frame is also referred to as a "first time".

A "target image" is a still image of a current frame. In the following description, a "target image" is also referred to as a "first image".

A "previous frame" is a time previous to a current frame. In the following description, a previous frame is also referred to as a "second time".

An "advance image" is a still image in a previous frame. In the following description, an "advance image" is also referred to as a "second image".

A "subsequent frame" is a time subsequent to a current frame. In the following description, a subsequent frame is also referred to as a "third frame".

In the example embodiment of the present invention, some of still images included in a moving image may be used. For example, in the example embodiment of the present invention, a still image may be selected and then processed at a predetermined interval. A predetermined interval is, for example, every other still image or every three still images. Alternatively, when an image capturing interval is one-thirtieth second, a still image may be selected and then processed every other second (one still image for 30 frames) in the example embodiment of the present invention.

In the following description, a moving image and a still image may be simply referred to as an "image" when not needed to be distinguished from each other.

A "property" of an image is a property associated with capturing the image. A property is also referred to as a "mode".

For example, a property is a sensitivity characteristic to a wavelength region. A specific example of a wavelength region is a band of infrared light, visible light, and ultraviolet light. For example, an image may include an image acquired from a visible-light sensor, and an image acquired from an invisible-light sensor. Alternatively, an image may include images (a plurality of invisible-light images) acquired from a plurality of invisible-light sensors (e.g., a near-infrared sensor and a near-ultraviolet sensor). Alternatively, an image may include images (a plurality of visible-light images) acquired from a plurality of visible-light sensors (e.g., a red sensor and a blue sensor). Alternatively, an image may include images acquired from a plurality of cameras different in exposure amount, or a plurality of cameras different in shutter speed.

Alternatively, an image may include images (e.g., an image with a flash and an image without a flash) different in presence and absence of a flash during capturing, or images different in illumination light. In this case, an image capturing time in each moving image may differ, but a difference in image capturing time is assumed to have a degree that does not affect image synthesis described later.

Alternatively, an image may include not only an image captured by use of a general camera or the like, but also an image in which predetermined information is converted into an image. For example, an image may be an image including information about a depth, such as an image from a depth sensor. Alternatively, an image may be an image such as an optical flow image in which motion is converted into information, or an image such as a stereo image in which a solid body is converted into information.

Alternatively, an image is not limited to an image captured by a camera or the like, and may be an image generated or modified by use of predetermined processing, such as an image generated by use of computer simulation or computer graphics.

Furthermore, in the example embodiment of the present invention, one synthetic image is generated for still images (a plurality of still images) at each time (each frame) in a moving image. However, in the example embodiment of the present invention, a plurality of synthetic images may be generated. For example, in the example embodiment of the present invention, a synthetic image focusing on a change in brightness (contrast), and a synthetic image focusing on a change in a frequency may be generated. In the following description, in order to clarify the description, one synthetic image is generated in the example embodiment of the present invention.

A still image includes a plurality of "pixels". In the example embodiment of the present invention, a value of a pixel is used for calculation of a value (hereinafter, referred to as an "index") used for selection of a region in accordance with a predetermined determination criterion.

More specifically, a value of a pixel is, for example, an optical value (e.g., luminance or brightness) at a position of a pixel. Alternatively, a value of a pixel is a value of image contrast, intensity of an edge, or a frequency. Alternatively, a value of a pixel may be a value calculated based on a value of contrast or the like. A pixel may include a plurality of values.

A value of a pixel may be calculated by use of a plurality of kinds of values. For example, a value of a pixel may be a value in which contrast and intensity of an edge are joined together by use of a predetermined weight.

A determination criterion may be in any form, and is determined by a user using an information processing device. For example, a determination criterion is visibility, readability, or legibility. An index is calculated by use of a predetermined calculation formula (a calculation formula using a value of a pixel) determined based on a determination criterion.

In the following description, as one example, an importance (e.g., contrast) in visibility is used as an index associated with a determination criterion. However, this does not limit the present invention.

In the following description, a pixel of a target image is also referred to as a "target pixel" or a "first pixel". A pixel of an advance image is also referred to as an "advance pixel" or a "second pixel".

Furthermore, in the following description, an index relevant to a "target pixel" is also referred to as a "target index"

or a "first index". An index relevant to an "advance pixel" is also referred to as an "advance index".

Each still image and a synthetic image include pixels of the same size, i.e., the same number of pixels. For example, an n-th pixel is at the same position in each image. Thus, except when description differentiating images is needed, a position of a pixel is described without differentiating images in the following description.

For example, a label described in detail later is information generated for each pixel. To describe this in detail, a label is not information generated for a pixel of a specific image, but information generated for each position of a pixel being common among images. A label is one piece of information being present in relation to a position of each pixel.

Furthermore, in the example embodiment of the present invention, a non-illustrated storage unit may be included, and data (an image and the like) being a processing target may be stored in the storage unit (e.g., a recording device or a memory). In this case, each component in the following description may acquire necessary data from the storage unit, and store generated or calculated data in the storage unit.

Alternatively, each component may transmit data to a component needing the data. Alternatively, each component may acquire necessary data from a component which generates or acquires the data. In this way, transmission and reception of data between components may be in any form. Thus, in the following description, description associated with storing, transmission, and reception of data is omitted as appropriate.

First Example Embodiment

A first example embodiment is described with reference to the drawings.

[Description of Configuration]

First, a configuration of an information processing device 200 according to the first example embodiment is described with reference to the drawings.

FIG. 1 is a block diagram illustrating one example of the configuration of the information processing device 200 according to the first example embodiment of the present invention.

The information processing device 200 includes an index calculation unit 201, a region selection unit 202, an index synthesis unit 203, an image synthesis unit 204, a position-difference calculation unit 205, an image deformation unit 206, an index change unit 207, an image acquisition unit 208, and an image output unit 209.

The image acquisition unit 208 acquires a plurality of moving images from a non-illustrated imaging device (e.g., a camera, or a sensor for measurement).

The index calculation unit 201 calculates an index for each pixel of a still image included in a moving image. For example, the index calculation unit 201 calculates a target index for each target pixel in a target image. An index is, for example, an importance in a level of visibility. The index calculation unit 201 may calculate an index per pixel of a synthetic image described later.

In the present example embodiment, an index may be in any form. For example, the index calculation unit 201 may calculate, as an index, an index by use of a calculation formula which calculates an index, based on image contrast, intensity of an edge, a frequency, or the like in an image.

For example, a pixel to be a boundary between bright and dark parts is a pixel having strong contrast, and is a pixel having high visibility. When an index is an importance in visibility, the index calculation unit 201 may use, as a calculation formula, a formula which calculates a great value for a pixel having strong contrast, for example. Note that, in this case, the index calculation unit 201 previously stores a calculation formula for calculating an index.

Alternatively, the index calculation unit 201 may calculate an index (e.g., an importance in visibility) by use of a calculation formula generated by using previously implemented machine learning. Machine learning may be in any form. Machine learning is, for example, machine learning using a support vector machine, random forest, deep learning, or the like. For example, the index calculation unit 201 previously executes machine learning, and stores, as a result of machine learning, a calculation formula which calculates a great value (e.g., a value of an importance) for a pixel having high visibility.

One example of machine learning is more specifically described as below. First, a predetermined training image (preferably, an image similar to an image targeted for processing), and data indicating an important region (learning target region) in the training image are previously prepared as supervised data. Then, as machine learning, the index calculation unit 201 learns, by use of the supervised data, a calculation formula (e.g., a regression function) which calculates an index (e.g., an importance).

Note that a component which executes machine learning is not limited to the index calculation unit 201. The index calculation unit 201 may acquire a calculation formula as a result of machine learning executed by a non-illustrated component.

The region selection unit 202 selects, based on a target index and a change index, a region (e.g., a region having a high value of an index) where an index satisfies a specific condition.

A change index will be described later.

Furthermore, the region selection unit 202 generates predetermined information (hereinafter, referred to as a "label") for each pixel (for each position of a pixel) in a selected region.

A "label" is information generated for each pixel, and is information indicating an image including a pixel relevant to an index used for selection of a region. Specifically, a "label" is information representing whether a position relevant to each pixel of the region is "selected based on a target index" or "selected based on a change index". Note that, in the following description, in a case of a pixel selected by use of both indices, a label is information indicating that a position relevant to each pixel of the region is selected based on a target index. However, in a case of a pixel selected by use of both indices, a label may be information indicating that a position relevant to each pixel of the region is selected based on a change index. Alternatively, a label may be information indicating that a position relevant to each pixel of the region is selected based on both indices. In the following description, a label is also referred to as "first information".

In the first example embodiment, a format and a value of a label may be in any form. For example, the region selection unit 202 may utilize, as a label, an index "m" of a moving image. For example, the region selection unit 202 may set, as a label, an index "m" of a moving image including a target image used for selection when a region is selected based on a "target index", and set "0" as a label when a region is selected based on a "change index".

A technique with which the region selection unit 202 selects a region may be in any form. For example, the region selection unit 202 may select a region where at least either a target index or a change index is higher than a predetermined threshold value. Note that a threshold value for a target index may be the same as or different from a threshold value for a change index. Alternatively, a threshold value may differ for each moving image.

Alternatively, the region selection unit 202 may select a region where an index is spatially and continuously high. In this case, the region selection unit 202 may use, for each index, an optimization calculation such as graph cut.

The index synthesis unit 203 sets a synthesis index for each pixel, based on a target index, a change index, and a label. More specifically, the index synthesis unit 203 sets, based on a label, a value of an index (a target index or a change index) used for selection of a region, as a synthesis index. The index synthesis unit 203 does not set a synthesis index for a pixel which is not selected as a region. However, the index synthesis unit 203 may set a predetermined value (e.g., a value of a target index) as a synthesis index in a pixel which is not selected as a region.

In the following description, a synthesis index is also referred to as a "third index".

The position-difference calculation unit 205 calculates a position difference amount between a synthetic image in a previous frame, and a target image.

A synthetic image in a previous frame is an image synthesized by use of an advance image or the like in processing of the previous frame. In the following description, a synthetic image in a previous frame is also referred to as an "advance synthetic image" or a "first synthetic image".

Note that a moving image is an image in which the same image capturing target is captured. Thus, a position difference amount becomes about the same value in each target image in the same frame. Thus, the position-difference calculation unit 205 may calculate a position difference amount between one or some of previously determined target images and an advance synthetic image.

A method of calculating a position difference amount between a target image and an advance synthetic image by the position-difference calculation unit 205 may be in any form. For example, the position-difference calculation unit 205 may calculate, as a position difference amount, an optical flow in a target image and an advance synthetic image. More specifically, for example, the position-difference calculation unit 205 may calculate an optical flow of a target image and an advance synthetic image by use of a Lucas-Kanade method, a Horn-Schunk method, or the like.

Alternatively, for example, the position-difference calculation unit 205 generates, based on a target image, a simplified synthetic image, as pre-processing, in order to calculate a more elaborated optical flow. Then, the position-difference calculation unit 205 may generate, as a position difference amount, an optical flow based on a position difference amount between the simplified synthetic image and an advance synthetic image. In the following description, a simplified synthetic image is also referred to as a "simple synthetic image" or a "fourth synthetic image".

For example, when the information processing device 200 acquires, as images, a plurality of visible-light images different in exposure amount, or a visible-light image and an invisible-light image, the position-difference calculation unit 205 generates, as a simple synthetic image, a blending image from the received images. Then, the position-difference calculation unit 205 may calculate a position difference amount between the generated blending image (one example of a simple synthetic image) and an advance synthetic image.

A blending image is an image in which a plurality of images are synthesized by use of a coefficient predetermined for each image.

Based on a target image, a deformation image, and a label, the image synthesis unit 204 generates a synthetic image relevant to a target image.

A deformation image is an image in which an advance synthetic image is deformed based on a position difference amount by the image deformation unit 206 described later. In the following description, a deformation image is also referred to as a "second synthetic image".

Moreover, in the following description, a synthetic image relevant to a target image is also referred to as a "target synthetic image" or a "third synthetic image".

The image synthesis unit 204 sets a pixel value of a target synthetic image as follows.

When a label is information selected based on a target index, the image synthesis unit 204 sets a pixel value of a target image as a pixel value of a target synthetic image. On the other hand, when a label is information selected based on a change index, the image synthesis unit 204 sets a pixel value of a deformation image as a pixel value of a target synthetic image.

For example, it is assumed that information of a label is an index (m) of a moving image including a pixel relevant to a selected target index when a region is selected based on a "target index", and information of a label is "0" when a region is selected based on a "change index".

In this case, the image synthesis unit 204 operates as follows. When a label is a value greater than 0 (when label=m), the image synthesis unit 204 sets a pixel value of a target image (a target image of an m-th moving image) relevant to a value (m) of a label, to a pixel value of a target synthetic image. On the other hand, when a label is 0, the image synthesis unit 204 sets a pixel value of a deformation image to a pixel value of a target synthetic image.

Alternatively, when a target image is used, the image synthesis unit 204 may set a pixel value of a target synthetic image by use of an image (e.g., a simple synthetic image) using a plurality of target images.

Alternatively, the image synthesis unit 204 may calculate a pixel value of a target synthetic image by use of a gradient-based method such as Poisson blending, based on a pixel value of a target image, a pixel value of a deformation image, and a label in a pixel.

The image deformation unit 206 deforms a target synthetic image, based on a position difference amount.

Herein, a target image of a current frame becomes an advance image, with respect to a target image of a subsequent time (subsequent frame). Thus, a target synthetic image to be a target of deformation herein becomes an advance synthetic image (an advance synthetic image of an advance frame) synthesized based on an advance image, with respect to a target image of a subsequent frame. As a result, an image deformed and thus generated by the image deformation unit 206 becomes a deformation image generated by deforming, based on a position difference amount, an advance synthetic image, with respect to a target image of a subsequent frame.

A technique used for deformation by the image deformation unit 206 may be in any form. The image deformation unit 206 may use a deformation technique based on a position difference amount generally used in moving image processing.

The index change unit 207 calculates, based on a position difference amount, a change index in each pixel from a synthesis index in each pixel. More specifically, the index change unit 207 calculates a change index by changing a position of a synthesis index in a pixel in such a way as to be relevant to a position difference amount.

However, an operation of the information processing device 200 is not limited to the operation described above. For example, the information processing device 200 may calculate, as a change index, an index in a deformation image by use of the index calculation unit 201. In this case, the information processing device 200 may not include the index synthesis unit 203 and the index change unit 207.

In the following description, a change index is also referred to as a "second index".

Herein, a target image of a current frame becomes an advance image, with respect to a target image of a subsequent time (subsequent frame). Thus, a synthesis index at this point is a synthesis index synthesized by use of an advance index relevant to an advance image, with respect to a target image in a subsequent frame. As a result, a change index calculated herein becomes an index in which a synthesis index synthesized by use of an advance index of an advance image is deformed based on a position difference amount, with respect to a target image of a subsequent frame.

A change index calculated based on a deformation image is also an index calculated based on a deformation image in which an advance synthetic image relevant to a synthesis index is deformed based on a position difference amount, and therefore, is equivalent to an index in which a synthesis index is deformed based on a position difference amount.

A technique used by the index change unit 207 may be in any form. The index change unit 207 may use a deformation technique based on a position difference amount generally used in moving image processing.

A change index is a value calculated based on an index (advance index) in an advance image. The region selection unit 202 selects a region by use of an index (change index) associated with an image (deformation image) in which a synthetic image (advance synthetic image) associated with a past still image (advance image) is deformed based on a position difference amount, in addition to an index (target index) associated with a still image (target image) being a processing target. The selected region includes a region where a change index in a deformation image becomes a predetermined value, in addition to a region of a target image where a target index becomes a predetermined value. Then, the image synthesis unit 204 generates a target synthetic image by use of the selected region. Thus, even when regions (e.g., important regions) where indices become a predetermined value are scattered in frames in a moving image, the information processing device 200 can generate a synthetic image using the regions.

The image output unit 209 outputs a synthetic image synthesized by the image synthesis unit 204, to a non-illustrated external device (e.g., a display device).

[Description of Operation]

Next, an operation of the information processing device 200 according to the first example embodiment is described with reference to the drawings.

Figure 2:
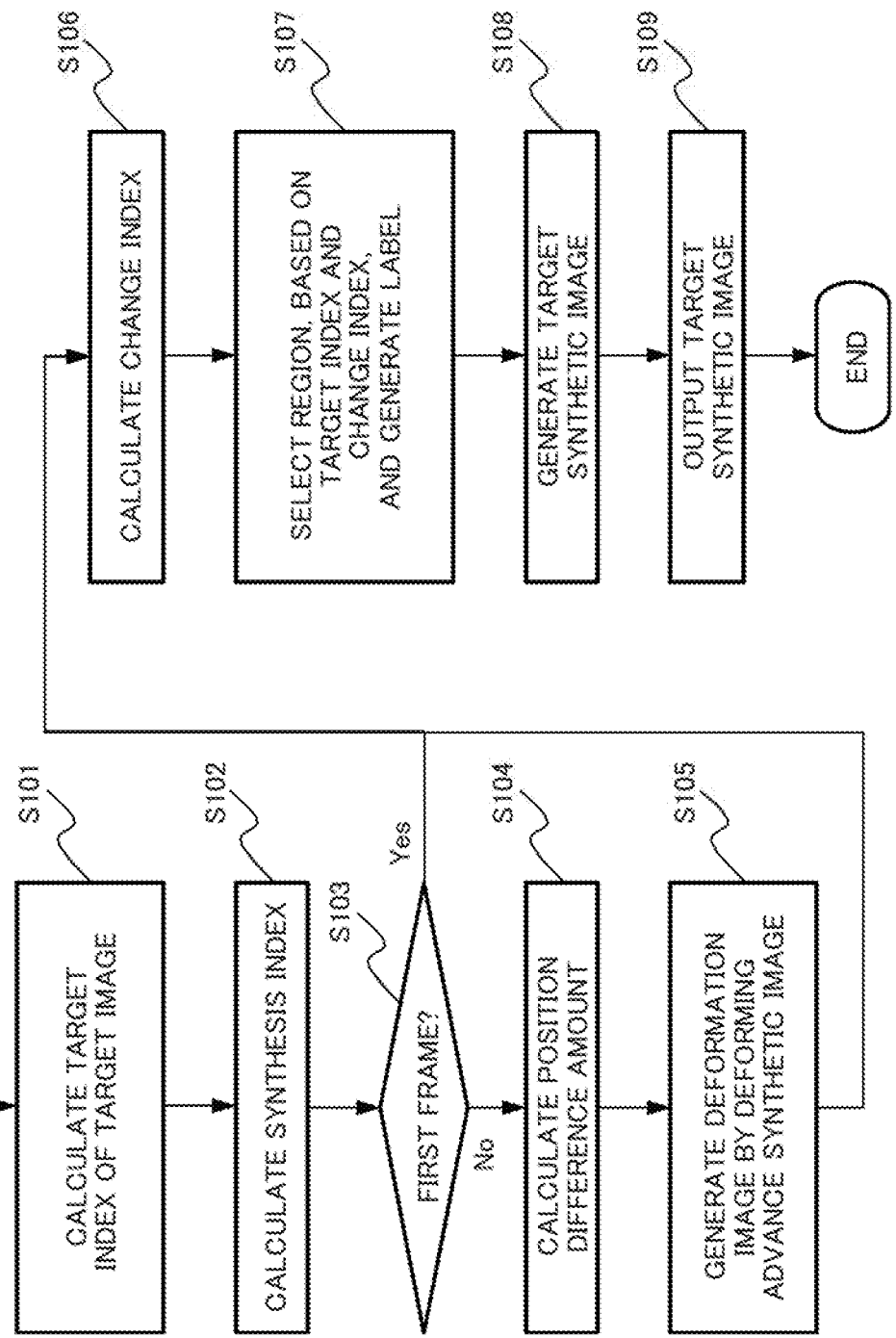
FIG. 2 is a flowchart illustrating one example of an operation of the information processing device according to the first example embodiment.

FIG. 2 is a flowchart illustrating one example of an operation of the information processing device 200 according to the first example embodiment.

When the information processing device 200 processes a still image at an initial time (first frame), no previous frame is present. Thus, the operation of the information processing device 200 differs between the "first frame", and "second and subsequent frames". Thus, the operation in the first frame and the operation in the second and subsequent frames are separately described.

Note that the image acquisition unit 208 acquires a plurality of moving images prior or in parallel to the following operation. A moving image includes a plurality of still images.

When an operation of the first frame is started, the information processing device 200 stores information indicating that the operation is an operation of the first frame. Then, the information processing device 200 starts the operation of the first frame. Each component refers to the information as required.

The operation associated with the first frame is described.

The index calculation unit 201 calculates a target index in a target image (step S101).

For the first frame, the index synthesis unit 203 calculates a synthesis index, based on the target index (step S102). Specifically, for the first frame, a synthesis index is a target index.

The information processing device 200 determines whether or not the target image is an image of the first frame (step S103).

In the present case, the target image is an image of the first frame (Yes in step S103), and therefore, the information processing device 200 proceeds to step S106. In other words, the position-difference calculation unit 205 and the image deformation unit 206 do not operate for the first frame.

Note that, for the first frame, the position-difference calculation unit 205 may calculate a predetermined value (e.g., a value indicating that a position difference amount is "0") as a position difference amount of each pixel. Even in this case, the image deformation unit 206 does not need to generate a deformation image. In other words, the information processing device 200 may execute the determination in step S103 after step S104.

For the first frame, the index change unit 207 calculates a change index, based on the synthesis index (step S106). Specifically, for the first frame, a change index is a synthesis index, i.e., a target index.

The region selection unit 202 selects a region, based on the target index and the change index, and further generates a label (step S107). However, for the first frame, a change index is a target index, as described above. In other words, the region selection unit 202 selects a region, based on the target index, and further generates a label. Note that the region selection unit 202 may not generate a label for the first frame.

For the first frame, the image synthesis unit 204 generates a target synthetic image, based on the target image and the target index (step S108).

The image output unit 209 outputs the target synthetic image (step S109).

The operation of the first frame comes to an end here.

When the operation of the first frame ends, the information processing device 200 deletes information indicating that a frame is the first frame, and stores information indicating that an operation is the operation of the second and subsequent frames. Each component refers to the information as required.

The target synthetic image generated in the first frame is an advance synthetic image of a second frame.

Next, the operation of the second and subsequent frames is described.

The index calculation unit 201 calculates a target index in a target image (step S101).

The index synthesis unit 203 calculates a synthesis index, based on the target index and a change index (step S102).

The information processing device 200 determines whether or not the target image is an image of the first frame (step S103).

In the present case, the target image is not an image of the first frame (No in step S103), and therefore, the information processing device 200 proceeds to step S104.

The position-difference calculation unit 205 calculates a position difference amount between the target image and an advance synthetic image (step S104).

The image deformation unit 206 generates a deformation image by deforming the advance synthetic image, based on the position difference amount (step S105).

The index change unit 207 calculates a change index by changing the synthesis index, based on the position difference amount (step S106).

The region selection unit 202 selects a region, based on the target index and the change index, and further generates a label (step S107).

The image synthesis unit 204 generates a target synthetic image, based on the target image, the deformation image, and the label (step S108).

The image output unit 209 outputs the target synthetic image (step S109).

Thereafter, the information processing device 200 repeats the operations from steps S101 to S109 until a target image ends.

An order of operations in the information processing device 200 is not limited to the order described above.

For example, a timing at which the image output unit 209 outputs the target synthetic image is not limited to a timing described above. For example, when the information processing device 200 includes a non-illustrated buffer, the image synthesis unit 204 may store the target synthetic image in the buffer, and the image output unit 209 may output a target synthetic image at a predetermined interval.

Note that the information processing device 200 may set a change index or the like to a predetermined value prior to an operation, and then start the operation. For example, the information processing device 200 may set each of all change indices to an initial value (e.g., a lowest value), set an advance synthetic image and a deformation image to a simple synthetic image of a target image of the first frame, and then start the operation described above. In this case, the operation of the first frame and the operation of the second and subsequent frames become the same operation. Thus, the information processing device 200 may not include step S103, may omit the operation of the first frame, and may start from the operation of the second and subsequent frames.

Next, the operation of the information processing device 200 is further described with reference to the drawings.

Figure 3:
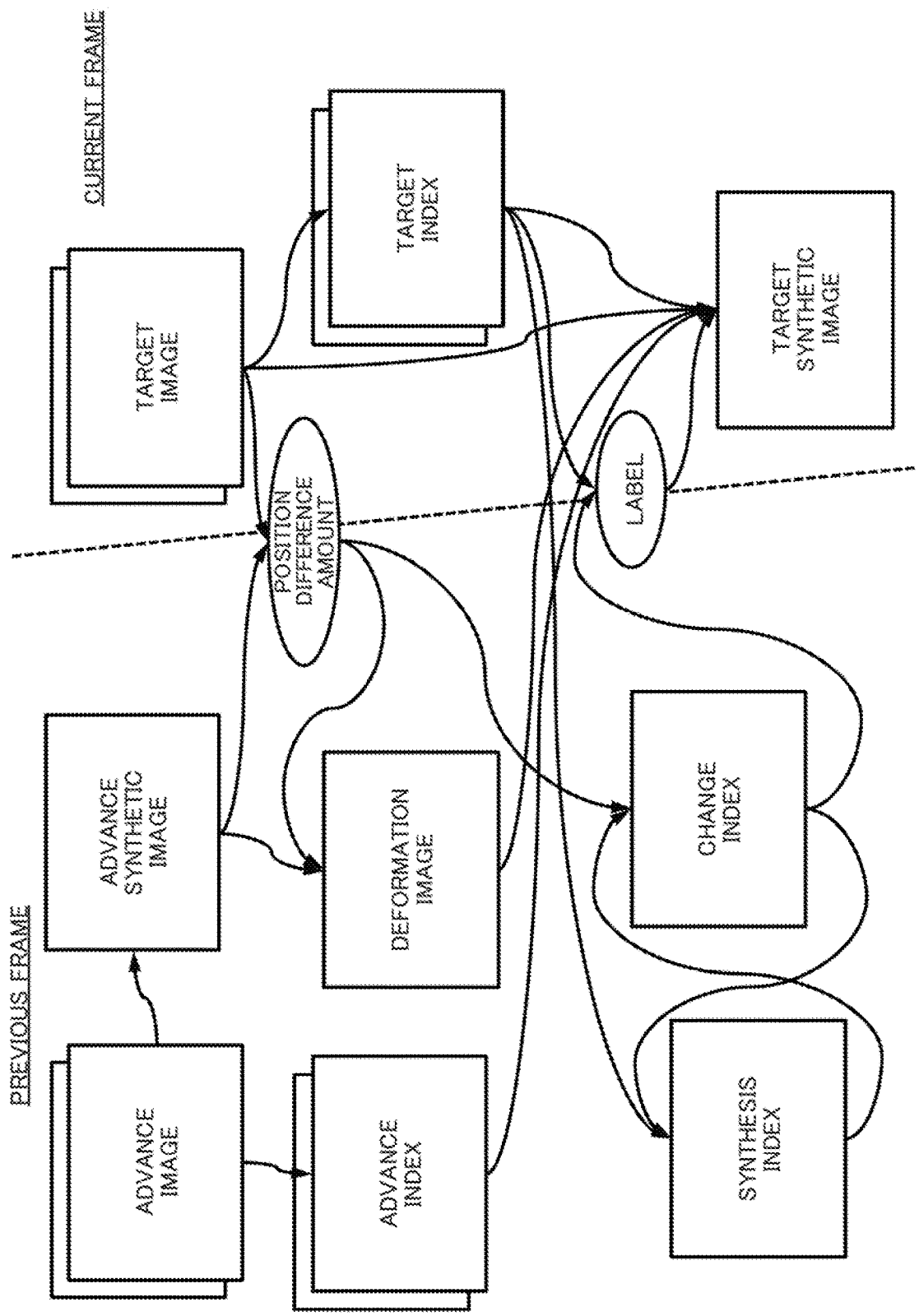
FIG. 3 is a diagram illustrating a relation among an image, an index, and the like in the first example embodiment.

FIG. 3 is a diagram illustrating a relation among an image, an index, and the like in the first example embodiment. In FIG. 3, an image and an index illustrated on a right side of a dotted line are an image and an index associated with a current frame. An image and an index illustrated on a left side of the dotted line are an image and an index associated with a previous frame. A position difference amount and a label illustrated on the dotted line are pieces of information calculated from both the current frame and the previous frame.

The index calculation unit 201 calculates a target index in a target image included in a plurality of target images of the current frame in a plurality of moving images. Note that, in processing of the previous frame, the index calculation unit 201 calculates an advance index in an advance pixel included in an advance image (a target image in the processing of the previous frame).

The position-difference calculation unit 205 calculates a position difference amount between an advance synthetic image synthesized based on an advance image of the previous frame, and the target image.

The image deformation unit 206 generates a deformation image by deforming the advance synthetic image, based on the position difference amount.

The index synthesis unit 203 syntheses a synthesis index by use of a change index calculated based on a synthesis index relevant to the advance pixel included in the advance image, and the target index.

The index change unit 207 calculates a new change index (a change index relevant to the target image) from the synthesis index, based on the position difference amount.

The region selection unit 202 selects a region including a position of a pixel where a target index satisfies a predetermined condition (e.g., is greater than a threshold value), and a position of a pixel where a change index satisfies a predetermined condition (e.g., is greater than a threshold value). Illustration of a region is omitted in FIG. 3. A region will be described later with reference to FIG. 4.

The region selection unit 202 generates a label being information indicating whether the region is selected by use of a target index or a change index.

The image synthesis unit 204 synthesizes, based on the deformation image, the target image, and the label, a target synthetic image relevant to the target image, in the region.

Figure 4:
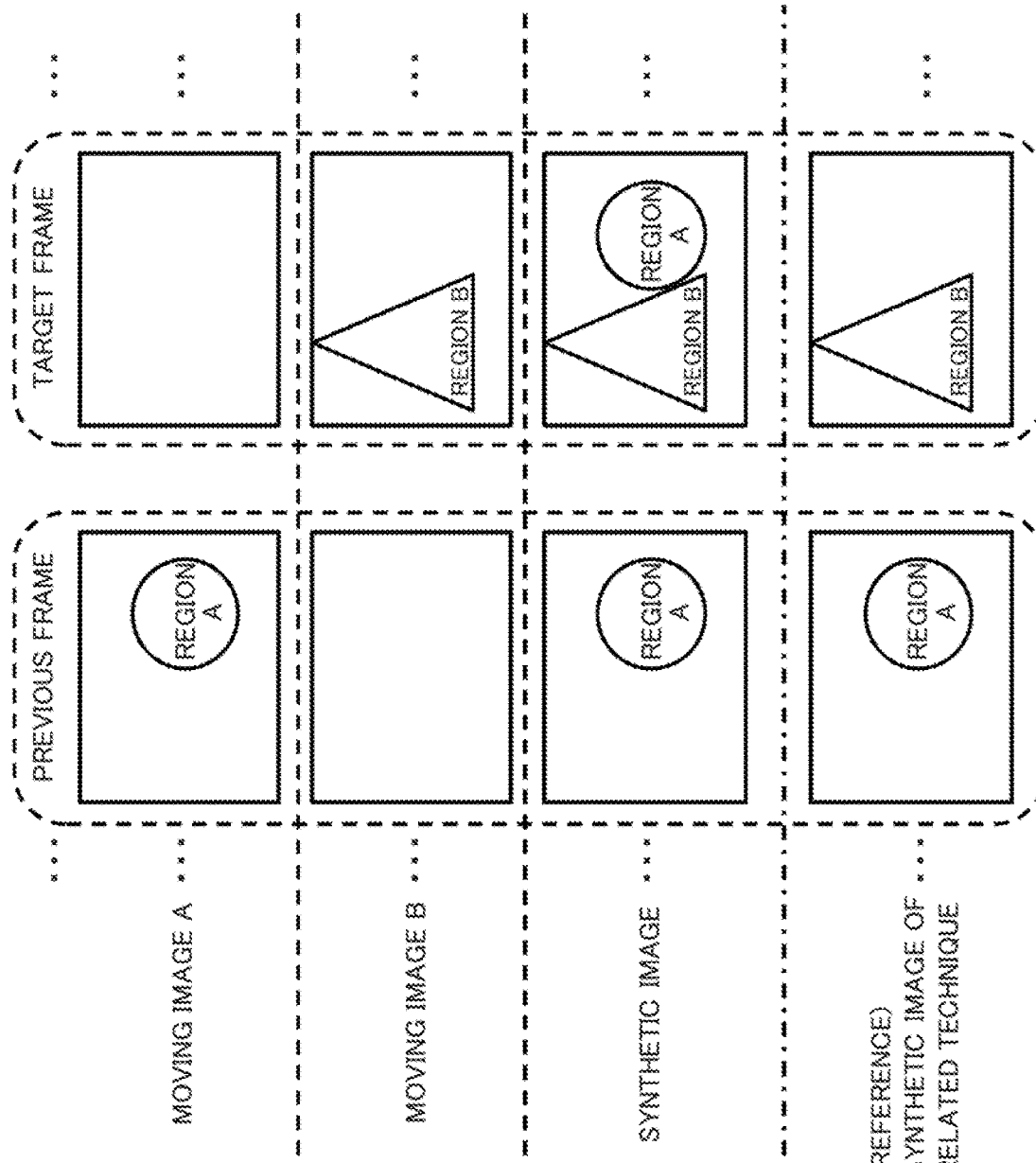
FIG. 4 is a diagram for describing a synthetic image in the first example embodiment.

FIG. 4 is a diagram for describing a synthetic image in the first example embodiment. FIG. 4 illustrates, as reference of description, a synthetic image when a technique (hereinafter, referred to as a "related technique") in NPL 1 or the like is used, in addition to a synthetic image generated by the first example embodiment.

In the following description, it is assumed that a predetermined condition applied to an index is that the index is higher than a predetermined threshold value.

For convenience of description, in FIG. 4, it is assumed that a first moving image (hereinafter, referred to as a "moving image A") and a second moving image (hereinafter, referred to as a "moving image B") do not include a region having a high index previous to a previous frame. Moreover, FIG. 4 omits deformation based on a position difference amount. In other words, in FIG. 4, a deformation image is the same image as an advance synthetic image.

First, a synthetic image in a previous frame is described.

The moving image A includes a region (hereinafter, referred to as a "region A") having a high index in the previous frame. On the other hand, the moving image B does not include a region having a high index in the previous frame.

In this case, a synthetic image (advance synthetic image) in the previous frame becomes an image including a region (region A) having a high index in the moving image A.

A synthetic image of the related technique also becomes an image including a region (region A) having a high index in the moving image A.

Next, a synthetic image in a current frame is described.

The moving image A does not include a region having a high index in the current frame. On the other hand, the moving image B includes a region (hereinafter, referred to as a "region B") having a high index in the current frame.

In this case, a synthetic image of the related technique becomes an image including a region (region B) having a high index in the moving image B.

On the other hand, as illustrated in FIG. 4, the information processing device 200 includes, in a synthetic image, a region (a region relevant to the region A) having a high index in a deformation image (advance synthetic image), in addition to the region B, by use of the operation described so far. In this way, the information processing device 200 can synthesize an image by use of predetermined regions scattered in frames in a moving image.

Description of Advantageous Effect

Next, an advantageous effect of the first example embodiment is described.

The information processing device 200 according to the first example embodiment can provide an advantageous effect of synthesizing an image by use of predetermined regions scattered in frames in a moving image.

A reason for this is as follows.

The information processing device 200 includes the index calculation unit 201, the region selection unit 202, the image synthesis unit 204, the position-difference calculation unit 205, and the image deformation unit 206. The information processing device 200 uses a plurality of moving images having different properties. The index calculation unit 201 calculates an index for selecting a predetermined region in a pixel of an image. The position-difference calculation unit 205 calculates a position difference amount between a target image (first image) in a current frame (first time) and an advance synthetic image (first synthetic image) in a previous frame (second time) being a time previous to the current frame (first time). The image deformation unit 206 generates a deformation image (second synthetic image) by deforming the advance synthetic image (first synthetic image), based on the position difference amount. The region selection unit 202 generates a label (first information) indicating a first region where a target index (first index) in the target image (first image) satisfies a predetermined condition, and a second region where a change index (second index) in the deformation image (second synthetic image) satisfies a predetermined condition. The image synthesis unit 204 synthesizes a target synthetic image (third synthetic image) at the first time, based on the target image (first image), the deformation image (second synthetic image), and the label (first information).

As described above, the index calculation unit 201 calculates an index of an image.

The position-difference calculation unit 205 calculates a position difference amount between a target image in a current frame and an advance synthetic image in a previous frame.

The image deformation unit 206 generates a deformation image by deforming the advance synthetic image, based on the position difference amount.

The region selection unit 202 selects a region by use of a change index associated with the deformation image, in addition to a target index associated with the target image.

The deformation image is a synthetic image associated with a previous frame considering the position difference amount. The change index is an index (advance index) associated with an advance image (an image of the previous frame) considering the position difference amount, and is an index associated with the deformation image.

The region selection unit 202 selects a region by use of an index (change index) associated with a deformation image, in addition to an index (target index) in a target image. Thus, the selected region includes a region where a change index associated with an advance image is high, in addition to a region where a target index is high. Even when regions having a high index are scattered in frames, the region selection unit 202 selects a region including regions (a region of a target image and a region of a deformation image) scattered in frames.

Moreover, the image synthesis unit 204 generates, in the selected region, a synthetic image by use of the deformation image in addition to the target image. Thus, even when regions (e.g., important regions) where an index becomes a predetermined value are scattered in frames in a moving image, the information processing device 200 can generate a synthetic image using the regions.

Furthermore, the information processing device 200 includes the index synthesis unit 203 and the index change unit 207. The index synthesis unit 203 calculates a synthesis index, based on a label, a target index, and a change index. Then, the index change unit 207 calculates an update index for a subsequent frame by changing the synthesis index, based on the position difference amount. By use of these components, the information processing device 200 calculates an update index which becomes necessary for an operation of a subsequent frame. However, the information processing device 200 may calculate an update index from a deformation image by use of the index calculation unit 201.

Furthermore, the information processing device 200 includes the image acquisition unit 208 and the image output unit 209. By use of these components, the information processing device 200 can externally acquire a moving image, and output a synthetic image to a predetermined device.

However, the information processing device 200 may include a non-illustrated storage unit, acquire a moving image from the storage unit, and store a target synthetic image in the storage unit. In this case, the information processing device 200 may not include the image acquisition unit 208 and/or the image output unit 209.

OVERVIEW OF EXAMPLE EMBODIMENT

An overview of the first example embodiment is described with reference to the drawings.

Figure 5:
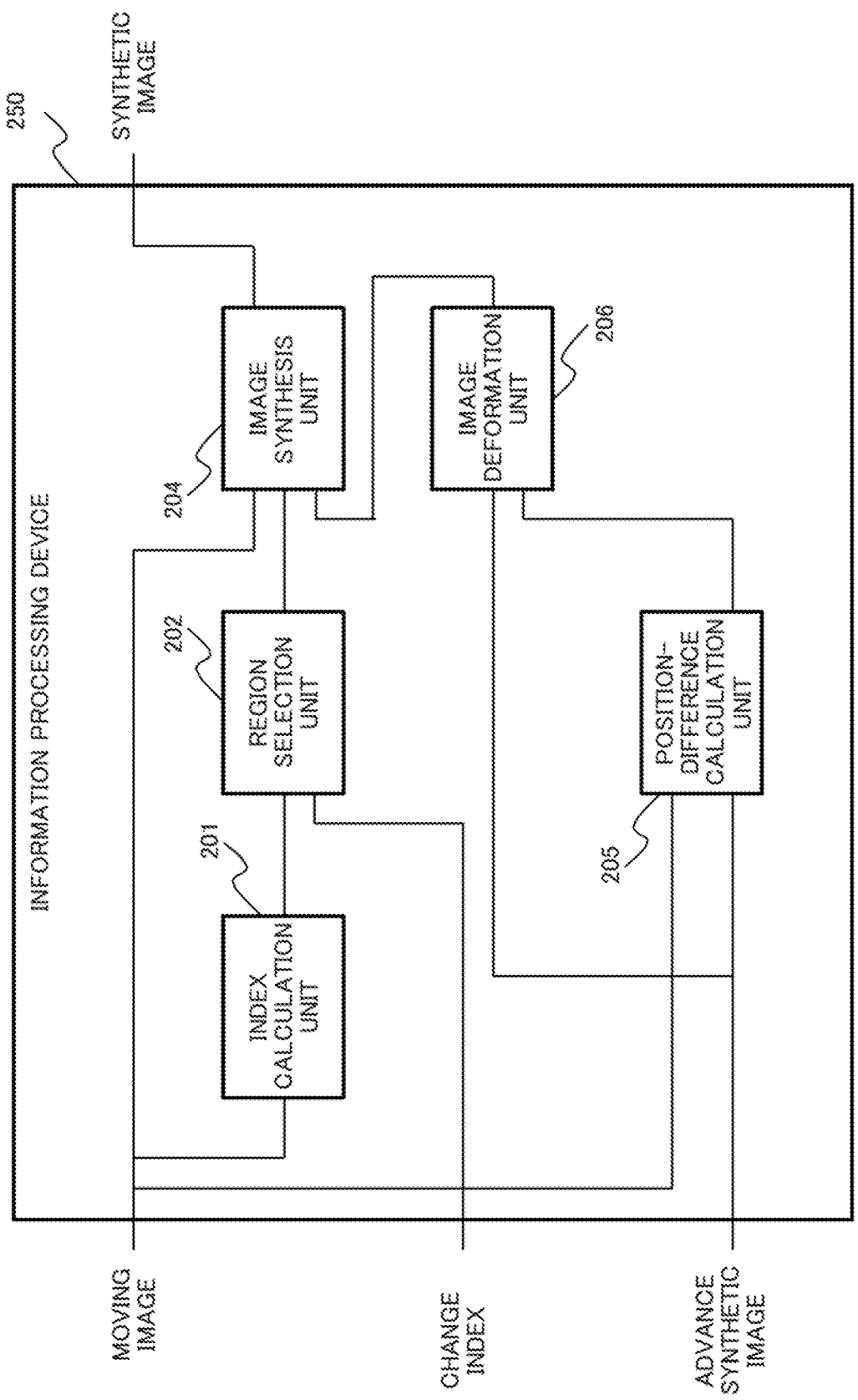
FIG. 5 is a block diagram illustrating one example of a configuration of an overview of the first example embodiment.

FIG. 5 is a block diagram illustrating one example of a configuration of an information processing device 250 being an overview of the first example embodiment.

The information processing device 250 includes an index calculation unit 201, a region selection unit 202, an image synthesis unit 204, a position-difference calculation unit 205, and an image deformation unit 206. The information processing device 250 uses a plurality of moving images having different properties. The index calculation unit 201 calculates an index for selecting a predetermined region in a pixel of an image. The position-difference calculation unit 205 calculates a position difference amount between a target image (first image) in a current frame (first time) and an advance synthetic image (first synthetic image) in a previous frame (second time) being a time advance to the current frame (first time). The image deformation unit 206 generates a deformation image (second synthetic image) by deforming the advance synthetic image (first synthetic image), based on the position difference amount. The region selection unit 202 generates a label (first information) indicating a first region where a target index (first index) in the target image (first image) satisfies a predetermined condition, and a second region where a change index (second index) in the deformation image (second synthetic image) satisfies a predetermined condition. The image synthesis unit 204 synthesizes a target synthetic image (third synthetic image) at the first time, based on the target image (first image), the deformation image (second synthetic image), and the label (first information).

The information processing device 250 configured in this way provides an advantageous effect of synthesizing an image by use of important regions scattered in frames in a moving image, as in the information processing device 200.

A reason for this is that the component in the information processing device 250 operates as described above, and synthesizes an image by use of predetermined regions scattered in frames in a moving image, as in the information processing device 200.

Note that the information processing device 250 is a minimum configuration of the first example embodiment.

[Description of Hardware]

A configuration of hardware of each of the information processing devices 200 and 250 is described with reference to the information processing device 200.

The information processing device 200 is configured as follows.

For example, each component of the information processing device 200 may be configured by a hardware circuit.

Alternatively, in the information processing device 200, each component may be configured by use of a plurality of devices connected via a network.

Alternatively, in the information processing device 200, a plurality of components may be configured by one piece of hardware.

Alternatively, the information processing device 200 may be implemented as a computer device including a central processing unit (CPU), a read only memory (ROM), and a random access memory (RAM). The information processing device 200 may be implemented as a computer device further including an input and output circuit (IOC) in addition to the components described above. The information processing device 200 may be implemented as a computer device further including a network interface circuit (NIC) in addition to the components described above.

Figure 6:
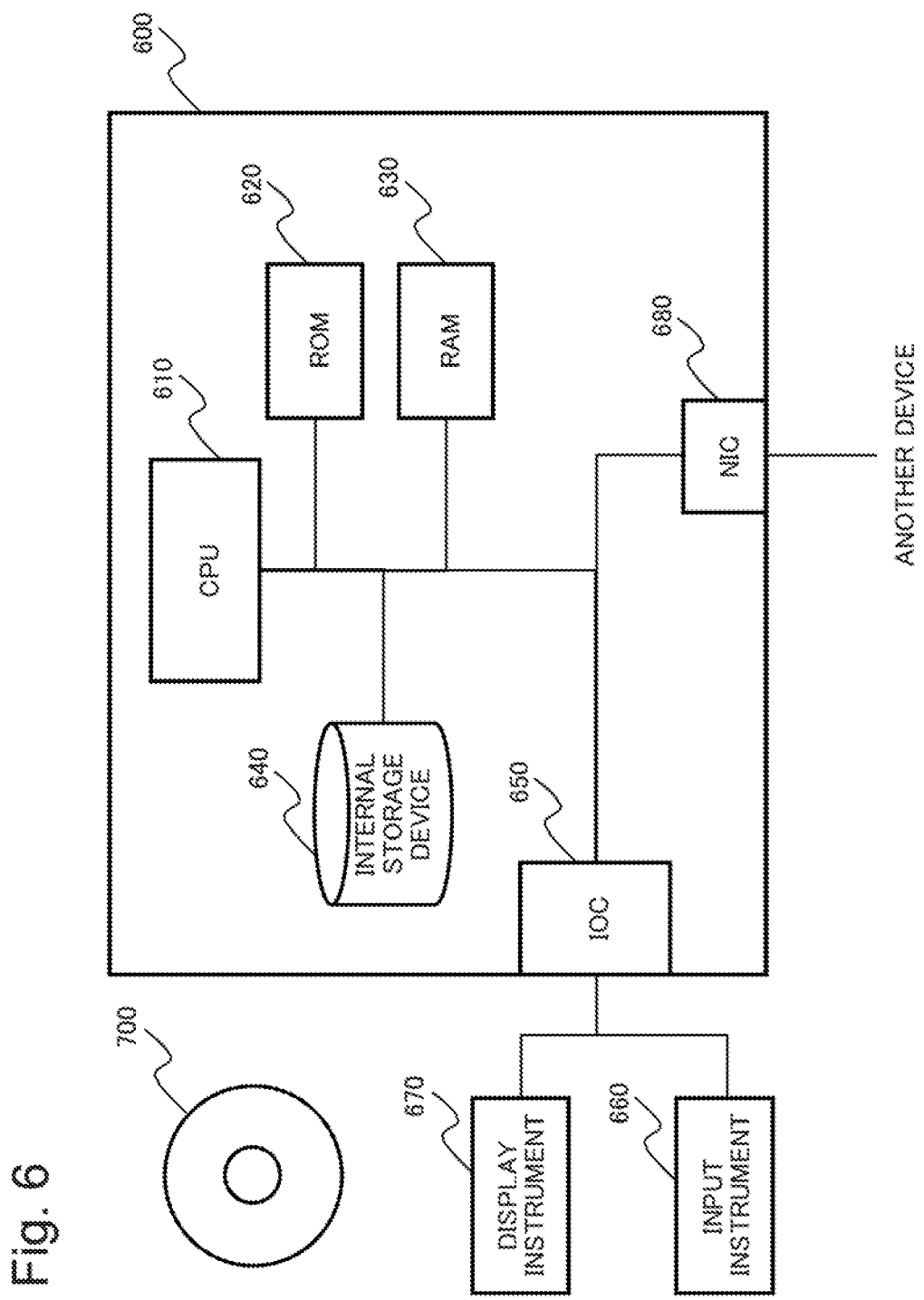
FIG. 6 is a block diagram illustrating one example of a hardware configuration of the information processing device according to the first example embodiment.

FIG. 6 is a block diagram illustrating a configuration of an information processing device 600 being one example of a hardware configuration of the information processing device 200 according to the first example embodiment.

The information processing device 600 includes a CPU 610, a ROM 620, a RAM 630, an internal storage device 640, an IOC 650, and a NIC 680, and configures a computer device.

The CPU 610 reads a program from the ROM 620. Then, the CPU 610 controls the RAM 630, the internal storage device 640, the IOC 650, and the NIC 680, based on the read program. Then, a computer including the CPU 610 controls the components, and implements each function as each of the components illustrated in FIG. 1. The components are the index calculation unit 201, the region selection unit 202, the index synthesis unit 203, the image synthesis unit 204, the position-difference calculation unit 205, the image deformation unit 206, the index change unit 207, the image acquisition unit 208, and the image output unit 209.

Alternatively, the information processing device 200 may be configured by use of a combination of hardware and software (a program).

The program may be distributed by being recorded in a recording medium 700 computer-readably storing the program. In this case, the CPU 610 may read the program included in the recording medium 700 into the RAM 630 or the internal storage device 640 by use of a non-illustrated recording medium reading device, and operate based on the read program.

The recording medium 700 is, for example, an optical disc, an exchangeable magnetic disc, or an exchangeable semiconductor memory.

Alternatively, the CPU 610 may receive a program from a non-illustrated external device via the NIC 680, store the program in the RAM 630 or the internal storage device 640, and then operate based on the stored program.

When implementing each function, the CPU 610 may use the RAM 630 or the internal storage device 640 as a transitory storage medium of a program.

The ROM 620 stores a program to be executed by the CPU 610, and fixed data. The ROM 620 is, for example, a programmable ROM (P-ROM) or a flash ROM.

The RAM 630 transitorily stores a program to be executed by the CPU 610, and data. The RAM 630 is, for example, a dynamic RAM (D-RAM).

The internal storage device 640 stores data and a program stored by the information processing device 600 for a long term. Moreover, the internal storage device 640 may operate as a temporary storage device of the CPU 610. The internal storage device 640 is, for example, a hard disk device, a magneto-optical disc device, a solid state drive (SSD), or a disk array device.

Herein, the ROM 620 and the internal storage device 640 are non-transitory recording media. On the other hand, the RAM 630 is a transitory recording medium. The CPU 610 is capable of operating based on a program stored in the ROM 620, the internal storage device 640, or the RAM 630. In other words, the CPU 610 is capable of operating by use of a non-transitory recording medium or a transitory recording medium.

The IOC 650 mediates data between the CPU 610, and an input instrument 660 and a display instrument 670. The IOC 650 is, for example, an IO interface card or a universal serial bus (USB) card. Moreover, the IOC 650 is not limited to a wired form such as USB, and may use a wireless form.

The input instrument 660 is an instrument which receives an input instruction from an operator of the information processing device 600. The input instrument 660 is, for example, a keyboard, a mouse, or a touch panel. The information processing device 600 may include the input instrument 660. In this case, the input instrument 660 may operate as the image acquisition unit 208.

The display instrument 670 is an instrument which displays information to an operator of the information processing device 600. The display instrument 670 is, for example, a liquid crystal display. The information processing device 600 may include the display instrument 670. In this case, the display instrument 670 may operate as the image output unit 209.

The NIC 680 relays exchange of data with a non-illustrated external device via a network. The NIC 680 is, for example, a local area network (LAN) card. Moreover, the NIC 680 is not limited to a wired form, and may use a wireless form. The NIC 680 may operate as the image acquisition unit 208 and/or the image output unit 209.

The information processing device 600 configured in this way can provide an advantageous effect similar to that of the information processing device 200.

A reason for this is that the CPU 610 of the information processing device 600 can implement a function similar to that of the information processing device 200, based on a program.

[Description of System]

An information processing system 300 including the information processing device 200 is described with reference to the drawings.

Figure 7:
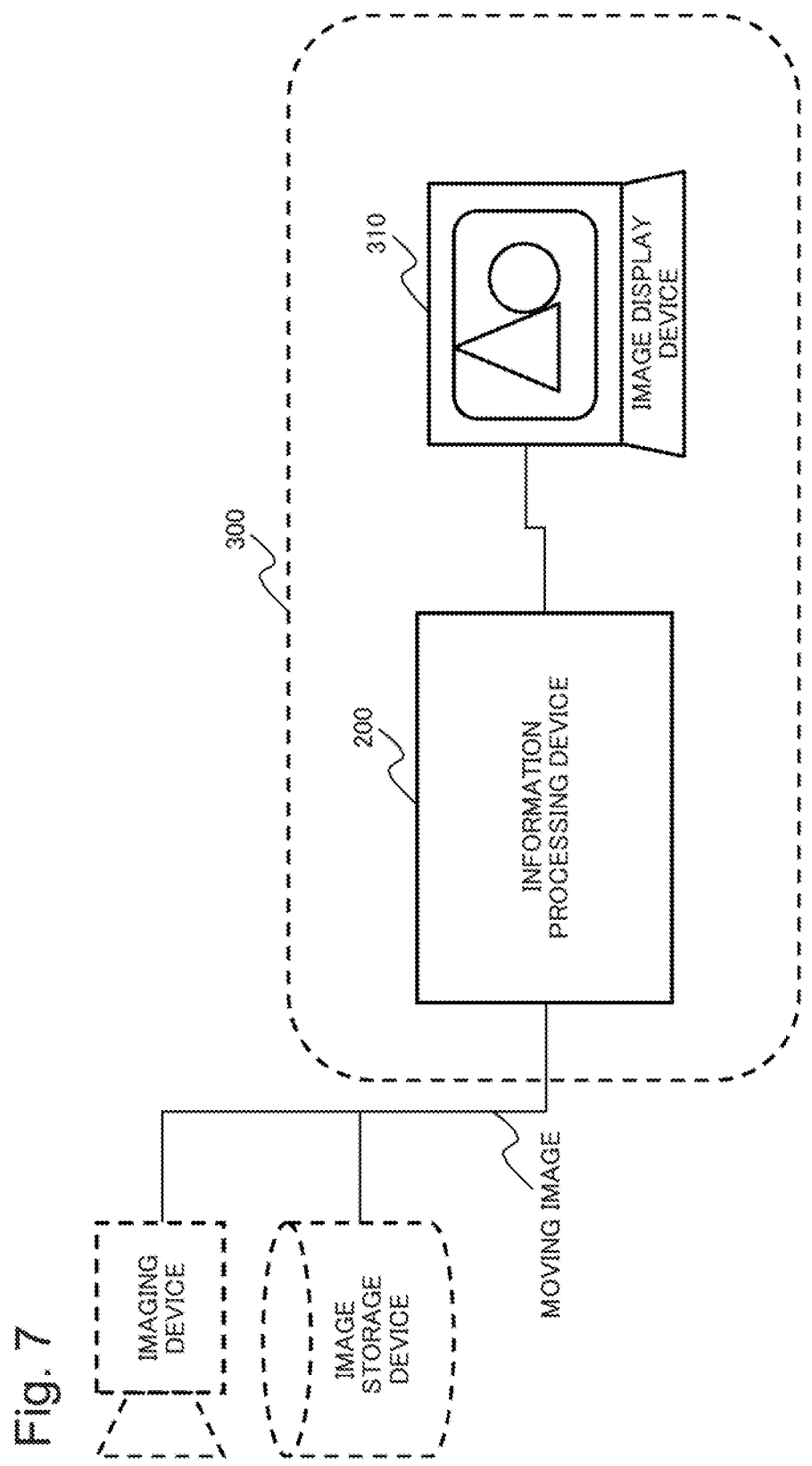
FIG. 7 is a block diagram illustrating one example of a configuration of an information processing system according to the first example embodiment.

FIG. 7 is a block diagram illustrating one example of a configuration of the information processing system 300 according to the first example embodiment.

The information processing system 300 includes the information processing device 200 and an image display device 310.

The information processing device 200 acquires a moving image from an external device. Then, the information processing device 200 generates a synthetic image, based on the operation described above. An external device may be in any form. FIG. 7 illustrates, as an exemplification of an external device, an imaging device which captures a moving image, and an image recording device which stores a moving image.

Furthermore, the information processing device 200 transmits the generated synthetic image (target synthetic image) to the image display device 310.

The image display device 310 displays the received synthetic image.

A synthetic image is an image in which predetermined regions (e.g., important regions) scattered in frames in a moving image are synthesized. Thus, even when important regions are scattered in frames, a user of the information processing system 300 can check an important region in a moving image by use of a synthetic image displayed on the image display device 310.

Note that a specific configuration of the present invention is not limited to the example embodiment described above, and modification made without departing from the spirit of the present invention, if any, falls within the present invention.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

200 Information processing device
201 Index calculation unit
202 Region selection unit
203 Index synthesis unit
204 Image synthesis unit
205 Position-difference calculation unit
206 Image deformation unit
207 Index change unit
208 Image acquisition unit
209 Image output unit
250 Information processing device
300 Information processing system
310 Image display device
600 Information processing device
610 CPU
620 ROM
630 RAM
640 Internal storage device
650 IOC
660 Input instrument
670 Display instrument
680 NIC
700 Recording medium

The invention claimed is:

1. An information processing device comprising:
a memory; and
at least one processor coupled to the memory,
the processor performing operations, the operations comprising:
calculating an index for selecting a predetermined region in a pixel of an image;
calculating a position difference amount between a first image at a first time among a plurality of moving images having different properties, and a first synthetic image at a second time being a time previous to the first time;
generating a second synthetic image by deforming the first synthetic image, based on the position difference amount;
generating first information indicating a first region where a first index in the first image satisfies a predetermined condition, and a second region where a second index in the second synthetic image satisfies a predetermined condition;
synthesizing a third synthetic image at the first time, based on the first image, the second synthetic image, and the first information;
synthesizing a third index, based on the first index and the second index in the first image; and
calculating the second index at a third time being a time subsequent to the first time, by changing the third index, based on the position difference amount.

2. The information processing device according to claim 1, wherein the operations further comprise
calculating, as the position difference amount, the position difference amount between one or a plurality of the first images and the first synthetic image, or the position difference amount between a fourth synthetic image synthesized based on the first image, and the first synthetic image.

3. The information processing device according to claim 1, wherein the operations further comprise
calculating the index by using a result of machine learning using a predetermined training image, and information indicating a learning target region in the training image.

4. The information processing device according to claim 1, wherein
the index includes at least one of image contrast, intensity of an edge, and a frequency that are associated with visibility, readability, or legibility in an image.

5. An information processing method comprising:
calculating an index for selecting a predetermined region in a pixel of an image;
calculating a position difference amount between a first image at a first time among a plurality of moving images having different properties, and a first synthetic image at a second time being a time previous to the first time;
generating a second synthetic image by deforming the first synthetic image, based on the position difference amount;
generating first information indicating a first region where a first index in the first image satisfies a predetermined condition, and a second region where a second index in the second synthetic image satisfies a predetermined condition;
synthesizing a third synthetic image at the first time, based on the first image, the second synthetic image, and the first information;

synthesizing a third index, based on the first index and the second index in the first image; and calculating the second index at a third time being a time subsequent to the first time, by changing the third index, based on the position difference amount.

6. A non-transitory computer-readable recording medium embodying a program, the program causing a computer to perform a method, the method comprising:

calculating an index for selecting a predetermined region in a pixel of an image;

calculating a position difference amount between a first image at a first time among a plurality of moving images having different properties, and a first synthetic image at a second time being a time previous to the first time;

generating a second synthetic image by deforming the first synthetic image, based on the position difference amount;

generating first information indicating a first region where a first index in the first image satisfies a predetermined condition, and a second region where a second index in the second synthetic image satisfies a predetermined condition;

synthesizing a third synthetic image at the first time, based on the first image, the second synthetic image, and the first information;

synthesizing a third index, based on the first index and the second index in the first image; and calculating the second index at a third time being a time subsequent to the first time, by changing the third index, based on the position difference amount.

* * * * *